(12) United States Patent
Lee et al.

(10) Patent No.: US 12,516,993 B2
(45) Date of Patent: Jan. 6, 2026

(54) DISTRIBUTED STRAIN SENSING SYSTEM AND METHOD THEREOF

(71) Applicant: FIBERPRO, Inc., Daejeon (KR)

(72) Inventors: Bong Wan Lee, Daejeon (KR); Jong Hyun Byeon, Daejeon (KR); Jae Chul Yong, Daejeon (KR)

(73) Assignee: FIBERPRO, Inc., Daejeon (KR)

( * ) Notice: Subject to any disclaimer, the term of this patent is extended or adjusted under 35 U.S.C. 154(b) by 459 days.

(21) Appl. No.: 18/052,723

(22) Filed: Nov. 4, 2022

(65) Prior Publication Data
US 2023/0184605 A1 Jun. 15, 2023

(30) Foreign Application Priority Data
Nov. 19, 2021 (KR) .................. 10-2021-0160140

(51) Int. Cl.
*G01L 1/24* (2006.01)
*G01D 5/353* (2006.01)
*G01D 5/36* (2006.01)

(52) U.S. Cl.
CPC .......... *G01L 1/242* (2013.01); *G01D 5/35358* (2013.01); *G01D 5/36* (2013.01)

(58) Field of Classification Search
CPC ....................................................... G01L 1/242
See application file for complete search history.

(56) References Cited

U.S. PATENT DOCUMENTS

| | | | | |
|---|---|---|---|---|
| 2013/0113629 | A1* | 5/2013 | Hartog ................. | G01V 1/226 340/853.2 |
| 2018/0292293 | A1* | 10/2018 | Levin ................. | G01M 11/3145 |
| 2020/0408574 | A1* | 12/2020 | Waagaard .......... | G01D 5/35354 |

FOREIGN PATENT DOCUMENTS

JP    2019148466 A    9/2019

OTHER PUBLICATIONS

Liehr, S. et al., "Relative change measurement of physical quantities using dual-wavelength coherent OTDR," Opt. Express vol. 25, No. 2, Jan. 12, 2017 (720-729), 10 pages.
Pastor-Graells, J. et al., "Single-shot distributed temperature and strain tracking using direct detection phase-sensitive OTDR with chirped pulses," Opt. Express 24, 13121-13133 (2016), Jun. 7, 2016, 13 pages.
Koyamada, Y. et al., "Fiber-Optic Distributed Strain and Temperature Sensing with Very High Measurand Resolution Over Long Range Using Coherent OTDR," Journal of Lightwave Technology, vol. 27, No. 9, May 1, 2009 (1142-1146), 5 pages.

* cited by examiner

Primary Examiner — Thomas A Hollweg
Assistant Examiner — Kirsten D. Endresen
(74) Attorney, Agent, or Firm — Inskeep IP Group, Inc.

(57) ABSTRACT

Provided is a method for providing a strain measurement value in a sensing optical fiber. The method may include outputting light to an optical fiber, in which the optical fiber includes a standard sensing optical fiber and a sensing optical fiber extending from the standard sensing optical fiber, in which the standard sensing optical fiber is accommodated inside an external environmental protection case, providing a strain measurement value in the sensing optical fiber based on Rayleigh scattered light reflected back from points of the optical fiber, and providing a final strain measurement value by compensating for an error caused by a change in light source in the strain measurement value in the sensing optical fiber.

17 Claims, 6 Drawing Sheets

DISTRIBUTED STRAIN SENSING SYSTEM AND METHOD THEREOF

CROSS-REFERENCE TO RELATED APPLICATION

This application claims the benefit of Korean Patent Application No. 10-2021-0160140 filed on Nov. 19, 2021, in the Korean Intellectual Property Office, the entire disclosure of which is incorporated herein by reference for all purposes.

BACKGROUND

There is a need to monitor the distribution of a temperature and a strain in relation to structures in various engineering fields, such as tunnels, bridges, dams, skyscrapers, submarine power cables, and air vehicles. To this end, it is necessary to use sensors that cover a wide area of a target structure, and optical fiber sensors may satisfy this need. As a system for measuring a strain in a target structure using an optical fiber as a sensor, a distributed strain sensing system has been known. The distributed strain sensing system has advantages of measuring a high-sensitivity strain, enabling distributed sensing at multiple points, being less affected by electromagnetic interference, and enabling easy deployment.

SUMMARY

The present disclosure relates to a technology for sensing a strain using an optical fiber.

Example embodiments provide a distributed strain sensing system capable of compensating for an error caused by a change in light source and a method thereof.

The objects of the present disclosure are not limited to the aforementioned object, and other objects, which are not mentioned above, will be apparent to a person having ordinary skill in the art from the following description.

According to an aspect, there is provided a distributed strain sensing system. The distributed strain sensing system may include a light source configured to emit light, wherein the light source includes an optical modulator configured to modulate the light emitted from the light source; an optical circulator having a first port, a second port, and a third port, in which the optical circulator is configured to receive the light emitted from the light source via the first port and output the received light via the second port; an optical fiber connected to the second port of the optical circulator, in which the optical fiber includes a standard sensing optical fiber connected to the second port of the optical circulator and a sensing optical fiber extending from the standard sensing optical fiber, and wherein the standard sensing optical fiber is housed inside an external environmental protection case; an optical receiver connected to the third port of the optical circulator; and an optical source error compensator connected to the optical receiver. The optical circulator may be configured to receive Rayleigh scattered light reflected back from different points of the optical fiber via the second port and output the received light via the third port. The optical receiver may be configured to provide a measurement value of strain in the sensing optical fiber based on the Rayleigh scattered light outputted via the third port of the optical circulator. The optical source error compensator may be configured to provide a final measurement value of strain by compensating the measurement value of strain for an error caused by a deviation in the light emitted from the light source.

In an example embodiment, the optical modulator may be further configured to modulate the light emitted from the light source so that a train of light pulses having a predetermined period is emitted from the light source. The optical modulator may be further configured to modulate the light emitted from the light source so that the light pulses have N different optical frequencies ranging from a first optical frequency to an N-th optical frequency in sequence and in a repetitive manner, wherein N is a natural number.

In an example embodiment, the Rayleigh scattered light is outputted via the third port of the optical circulator once in response to each of the light pulses being outputted via the second port of the optical circulator. The optical receiver is further configured to provide a scattered light intensity distribution waveform representing intensities of the scattered lights reflected from the different points of the optical fiber based on the Rayleigh scattered light outputted via the third port of the optical circulator. The scattered light intensity distribution waveforms provided in response to the light pulses being outputted via the second port of the optical circulator are associated with the optical frequencies of the light pulses outputted via the second port of the optical circulator, respectively.

In an example embodiment, the optical receiver may be further configured to provide a measurement value of strain at a particular point of the sensing optical fiber by analyzing the provided scattered light intensity distribution waveforms.

In an example embodiment, the optical receiver may be further configured to identify, as a first reference intensity, an intensity of the scattered light reflected from the particular point of the sensing optical fiber in the scattered light intensity distribution waveform associated with the first optical frequency, and to identify a specific scattered light intensity distribution waveform having an intensity of the scattered light reflected from the particular point, which is matched with the first reference intensity, by examining N consecutive scattered light intensity distribution waveforms provided before the scattered light intensity distribution waveform associated with the first optical frequency, and to determine an optical frequency associated with the specific scattered light intensity distribution waveform as a first matched optical frequency.

In an example embodiment, the optical receiver may be further configured to provide a measurement value of strain at the particular point of the sensing optical fiber using the first optical frequency and the first matched optical frequency.

In an example embodiment, the optical receiver may be further configured to provide a measurement value of strain at the particular point of the sensing optical fiber using the following equation:

$$\Delta \varepsilon_F \approx -\left(\frac{1}{0.78}\right) \times \frac{\Delta v_{F_1}}{v_0}$$

wherein $\Delta \varepsilon_F$ represents a measurement value of strain at the particular point of the sensing optical fiber, $v_0$ represents the first optical frequency, and $\Delta v_{F_1}$ represents a difference between the first optical frequency and the first matched optical frequency.

In an example embodiment, the optical receiver may be further configured to:
sample the N scattered light intensity distribution waveforms associated respectively with the N different optical frequencies to collect scattered light intensities reflected from the particular point of the sensing optical fiber, provide a scattered light intensity distribution waveform relating to the particular point using the collected scattered light intensities, the scattered light intensity distribution waveform relating to the particular point representing the collected scattered light intensities with respect to the N different optical frequencies, and determine a frequency shift value by comparing the scattered light intensity distribution waveform relating to the particular point with the scattered light intensity distribution waveform provided previously in relation to the particular point.

In an example embodiment, the optical receiver is further configured to provide a measurement value of strain at the particular point of the sensing optical fiber using the following equation:

$$\Delta\varepsilon_F \approx -\left(\frac{1}{0.78}\right) \times \frac{\Delta v_{F_2}}{v_0}$$

wherein $\Delta\varepsilon_F$ represents a measurement value of strain at the particular point of the sensing optical fiber, $v_0$ represents the first optical frequency, and $\Delta v_{F_2}$ represents the frequency shift value.

In an example embodiment, the optical receiver outputs the provided scattered light intensity distribution waveforms, and the optical source error compensator is further configured to compensate the measurement value of strain at the particular point of the sensing optical fiber for the error caused by the deviation in the light emitted from the light source by analyzing the outputted scattered light intensity distribution waveforms.

In an example embodiment, the optical source error compensator is further configured to determine a measurement value of strain at any one of the different points of the standard sensing optical fiber or an average value of measurement values of stain at the different points of the standard sensing optical fiber as the error caused by the deviation in the light emitted from the light source.

In an example embodiment, for the determination of the measurement value of strain at each of the different points of the standard sensing optical fiber, the optical source error compensator may be further configured to:

identify, as a second reference intensity, an intensity of the scattered light reflected from the respective point of the standard sensing optical fiber in the scattered light intensity distribution waveform associated with the first optical frequency, identify a specific scattered light intensity distribution waveform having an intensity of the scattered light reflected from the respective point of the standard sensing optical fiber, which is matched with the second reference intensity, by examining N consecutive scattered light intensity distribution waveforms provided before the scattered light intensity distribution waveform associated with the first optical frequency, and determine an optical frequency associated with the specific scattered light intensity distribution waveform as a second matched optical frequency.

In an example embodiment, the optical source error compensator uses the first optical frequency and the second matched optical frequency to determine a measurement value of strain at each of the different points of the standard sensing optical fiber.

In an example embodiment, the optical source error compensator may be further configured to use the following equation to determine a measurement value of strain at each of the different points of the standard sensing optical fiber:

$$\Delta\varepsilon_{SF} \approx -\left(\frac{1}{0.78}\right) \times \frac{\Delta v_{SF_1}}{v_0}$$

wherein $\Delta\varepsilon_{SF}$ represents a measurement value of strain at the respective point of the standard sensing optical fiber, $v_0$ represents the first optical frequency, and $\Delta v_{SF_1}$ represents a difference between the first optical frequency and the second matched optical frequency.

In an example embodiment, for the determination of the measurement value of strain at each of the different points of the standard sensing optical fiber, the optical source error compensator is further configured to:

sample the N scattered light intensity distribution waveforms associated respectively with the N different optical frequencies to collect scattered light intensities reflected from the respective point of the standard sensing optical fiber, provide a scattered light intensity distribution waveform relating to the respective point of the standard sensing optical fiber using the collected scattered light intensities, the scattered light intensity distribution waveform relating to the respective point representing the collected scattered light intensities with respect to the N different optical frequencies, and determine a frequency shift value by comparing the scattered light intensity distribution waveform relating to the respective point of the standard sensing optical fiber with the scattered light intensity distribution waveform provided previously in relation to the respective point of the standard sensing optical fiber.

In an example embodiment, the optical source error compensator may be further configured to use the following equation to determine a measurement value of strain at each of the different points of the standard sensing optical fiber:

$$\Delta\varepsilon_{SF} \approx -\left(\frac{1}{0.78}\right) \times \frac{\Delta v_{SF_2}}{v_0}$$

wherein $\Delta\varepsilon_{SF}$ represents a measurement value of strain at the respective point of the standard sensing optical fiber, $v_0$ represents the first optical frequency, and $\Delta v_{SF_2}$ represents the frequency shift value.

In an example embodiment, a light reflection point is inserted into the standard sensing optical fiber so as to have light with a higher reflectance than Rayleigh scattered light reflected at the different points of the standard sensing optical fiber.

According to another aspect, there is provided a method for providing a measurement value of strain in a sensing optical fiber comprising:

outputting light to an optical fiber, wherein the optical fiber includes a standard sensing optical fiber and a sensing optical fiber extending from the standard sensing optical fiber, wherein the standard sensing optical fiber is housed inside an external environmental protection case;

providing a measurement value of strain in the sensing optical fiber based on Rayleigh scattered light reflected back from different points of the optical fiber; and compensating the measurement value of strain in the sensing optical fiber for an error caused by a deviation in the light emitted from the light source to provide a final measurement value of strain.

In an example embodiment, the outputting light to an optical fiber may include emitting a train of light pulses having a predetermined period to the optical fiber, and the emitting a train of light pulses having a predetermined period to the optical fiber may include emitting the train of light pulses so that the light pulses have N different optical frequencies ranging from a first optical frequency to an N-th optical frequency in sequence and in a repetitive manner, wherein N is a natural number.

In an example embodiment, the providing a measurement value of strain in the sensing optical fiber based on Rayleigh scattered light reflected back from different points of the optical fiber may include: receiving the Rayleigh scattered light once in response to each of the light pulses being emitted to the optical fiber, and providing a scattered light intensity distribution waveform representing intensities of the scattered lights reflected from the different points of the optical fiber based on the Rayleigh scattered light, wherein the scattered light intensity distribution waveforms provided in response to the light pulses being emitted to the optical fiber are associated with the optical frequencies of the light pulses, respectively.

In an example embodiment, the providing a measurement value of strain in the sensing optical fiber based on Rayleigh scattered light reflected back from different points of the optical fiber further may include providing a measurement value of strain at a particular point of the sensing optical fiber by analyzing the provided scattered light intensity distribution waveforms.

In an example embodiment, the providing a measurement value of strain at a particular point of the sensing optical fiber by analyzing the provided scattered light intensity distribution waveforms may include:
  identifying, as a first reference intensity, an intensity of the scattered light reflected from the particular point of the sensing optical fiber in the scattered light intensity distribution waveform associated with the first optical frequency,
  identifying a specific scattered light intensity distribution waveform having an intensity of the scattered light reflected from the particular point, which is matched with the first reference intensity, by examining N consecutive scattered light intensity distribution waveforms provided before the scattered light intensity distribution waveform associated with the first optical frequency, and
  determining an optical frequency associated with the specific scattered light intensity distribution waveform as a first matched optical frequency.

In an example embodiment, the providing a measurement value of strain at a particular point of the sensing optical fiber by analyzing the provided scattered light intensity distribution waveforms further may include providing a measurement value of strain at the particular point of the sensing optical fiber using the first optical frequency and the first matched optical frequency.

In an example embodiment, the providing a measurement value of strain at the particular point of the sensing optical fiber using the first optical frequency and the first matched optical frequency may include:
  providing a measurement value of strain at the particular point of the sensing optical fiber using the following equation:

$$\Delta\varepsilon_F \approx -\left(\frac{1}{0.78}\right) \times \frac{\Delta v_{F_1}}{v_0}$$

wherein $\Delta\varepsilon_F$ represents a measurement value of strain at the particular point of the sensing optical fiber, $v_0$ represents the first optical frequency, and $\Delta v_{F_1}$ represents a difference between the first optical frequency and the first matched optical frequency.

In an example embodiment, the providing a measurement value of strain at the particular point of the sensing optical fiber by analyzing the provided scattered light intensity distribution waveforms may include:
  sampling the N scattered light intensity distribution waveforms associated respectively with the N different optical frequencies to collect scattered light intensities reflected from the particular point of the sensing optical fiber,
  providing a scattered light intensity distribution waveform relating to the particular point using the collected scattered light intensities, the scattered light intensity distribution waveform relating to the particular point representing the collected scattered light intensities with respect to the N different optical frequencies, and
  determining a frequency shift value by comparing the scattered light intensity distribution waveform relating to the particular point with the scattered light intensity distribution waveform provided previously in relation to the particular point.

In an example embodiment, the providing a measurement value of strain at the particular point of the sensing optical fiber by analyzing the provided scattered light intensity distribution waveforms further may include providing a measurement value of strain at the particular point of the sensing optical fiber using the following equation:

$$\Delta\varepsilon_F \approx -\left(\frac{1}{0.78}\right) \times \frac{\Delta v_{F_2}}{v_0}$$

wherein $\Delta\varepsilon_F$ represents a measurement value of strain at the particular point of the sensing optical fiber, $v_0$ represents the first optical frequency, and $\Delta v_{F_2}$ represents the frequency shift value.

In an example embodiment, the compensating the measurement value of strain in the sensing optical fiber for an error caused by a deviation in the light emitted from the light source to provide a final measurement value of strain may include compensating the measurement value of strain at the particular point of the sensing optical fiber for the error caused by the deviation in the light emitted from the light source by analyzing the provided scattered light intensity distribution waveforms.

In an example embodiment, the compensating the measurement value of strain in the sensing optical fiber for an error caused by a deviation in the light emitted from the light source to provide a final measurement value of strain may include:
  determining a measurement value of strain at any one of the different points of the standard sensing optical fiber as the error caused by the deviation in the light emitted from the light source, or determining measurement values of strain at the different points of the standard sensing optical fiber and determining an average value of the measurement values of strain as the error caused by the deviation in the light emitted from the light source.

In an example embodiment, the determining measurement values of strain at the different points of the standard sensing optical fiber may include:
  identifying, as a second reference intensity, an intensity of the scattered light reflected from the respective point of the standard sensing optical fiber in the scattered light intensity distribution waveform associated with the first optical frequency,
  identifying a specific scattered light intensity distribution waveform having an intensity of the scattered light reflected from the respective point of the standard sensing optical fiber, which is matched with the second reference intensity, by examining N consecutive scattered light intensity distribution waveforms provided before the scattered light intensity distribution waveform associated with the first optical frequency, and
  determining an optical frequency associated with the specific scattered light intensity distribution waveform as a second matched optical frequency.

In an example embodiment, the determining measurement values of strain at the different points of the standard sensing optical fiber may further include determining a measurement value of strain at each of the different points of the standard sensing optical fiber using the first optical frequency and the second matched optical frequency.

In an example embodiment, the determining a measurement value of strain at each of the different points of the standard sensing optical fiber using the first optical frequency and the second matched optical frequency may include:
  determining a measurement value of strain at each of the different points of the standard sensing optical fiber using the following equation:

$$\Delta\varepsilon_{SF} \approx -\left(\frac{1}{0.78}\right) \times \frac{\Delta v_{SF_1}}{v_0}$$

wherein $\Delta\varepsilon_{SF}$ represents a measurement value of strain at the respective point of the standard sensing optical fiber, $v_0$ represents the first optical frequency, and $\Delta v_{SF_1}$ represents a difference between the first optical frequency and the second matched optical frequency.

In an example embodiment, the determining measurement values of strain at the different points of the standard sensing optical fiber may include:
  sampling the N scattered light intensity distribution waveforms associated respectively with the N different optical frequencies to collect scattered light intensities reflected from the respective point of the standard sensing optical fiber,
  providing a scattered light intensity distribution waveform relating to the respective point of the standard sensing optical fiber using the collected scattered light intensities, the scattered light intensity distribution waveform relating to the respective point representing the collected scattered light intensities with respect to the N different optical frequencies, and
  determining a frequency shift value by comparing the scattered light intensity distribution waveform relating to the respective point of the standard sensing optical fiber with the scattered light intensity distribution waveform provided previously in relation to the respective point of the standard sensing optical fiber.

In an example embodiment, the determining measurement values of strain at the different points of the standard sensing optical fiber may further include:
  determining a measurement value of strain at each of the different points of the standard sensing optical fiber using the following equation:

$$\Delta\varepsilon_{SF} \approx -\left(\frac{1}{0.78}\right) \times \frac{\Delta v_{SF_2}}{v_0}$$

wherein $\Delta\varepsilon_{SF}$ represents a measurement value of strain at the respective point of the standard sensing optical fiber, $v_0$ represents the first optical frequency, and $\Delta v_{SF_2}$ represents the frequency shift value.

According to another aspect, there is provided a computer program to enable a processor to perform:
  outputting light to an optical fiber, wherein the optical fiber includes a standard sensing optical fiber and a sensing optical fiber extending from the standard sensing optical fiber, wherein the standard sensing optical fiber is housed inside an external environmental protection case;
  providing a measurement value of strain in the sensing optical fiber based on Rayleigh scattered light reflected back from different points of the optical fiber; and
  compensating the measurement value of strain in the sensing optical fiber for an error caused by a deviation in the light emitted from the light source to provide a final measurement value of strain.

Additional aspects of example embodiments will be set forth in part in the description which follows and, in part, will be apparent from the description, or may be learned by practice of the disclosure.

According to example embodiments, it is possible to compensate for an error caused by a change in light source by providing a strain measurement value in a sensing optical fiber using the distributed strain sensing system.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
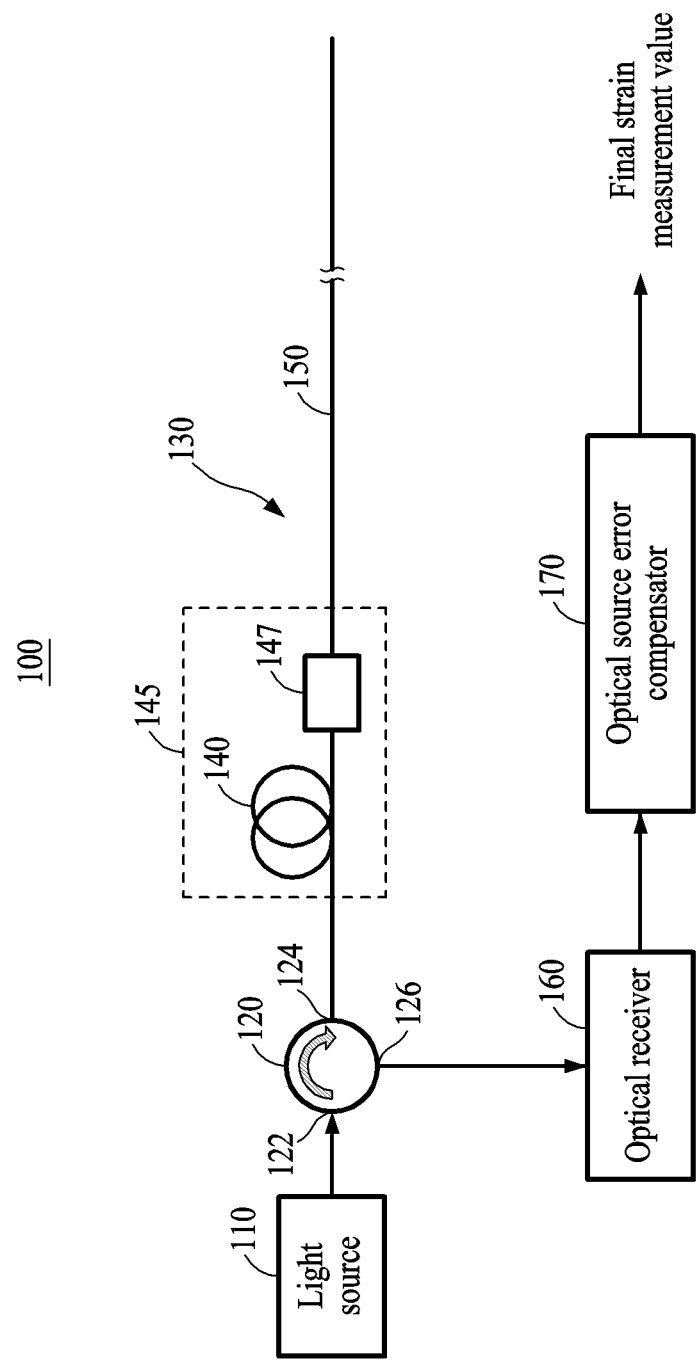
FIG. 1 is a diagram illustrating an example embodiment of a distributed strain sensing system.

Specific structural or functional descriptions of example embodiments will be disclosed for purposes of only examples, and may be changed and implemented in various forms. Accordingly, actual example embodiments are not limited only to the disclosed specific example embodiments, and the scope of the present disclosure includes changes, equivalents, or substitutes included in the technical spirit.

Terms such as "first" or "second" may be used to describe various components, but these terms should be interpreted only for the purpose of distinguishing one component from other components. For example, a "first component" may be referred to as a "second component", and similarly, the "second component" may be referred to as the "first component".

It should be understood that, when it is described that a component is "connected to" the other component, the component may be directly connected to or access the other component or another component may be present therebetween.

Singular expressions used herein include plurals expressions unless they have definitely opposite meanings in the context. In the present disclosure, it should be understood that term "comprising" or "having" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless otherwise contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present disclosure.

Hereinafter, example embodiments will be described in detail with reference to the accompanying drawings. In addition, in the description with reference to the accompanying drawings, regardless of reference numerals, like components designate like reference numerals and a duplicated description thereof will be omitted.

FIG. 1 is a diagram illustrating an example embodiment of a distributed strain sensing system.

As illustrated in FIG. 1, a distributed strain sensing system 100 may include a light source 110 configured to emit light. The light source 110 may include an optical modulator (not illustrated) configured to modulate the light emitted from the light source 110. In one example embodiment, the optical modulator is configured to modulate the light emitted from the light source 110 so that a train of light pulses having a specific period is emitted from the light source 110. In an example embodiment, the optical modulator is further configured to modulate the light emitted from the light source so that the optical pulses have N optical frequencies from a first optical frequency $v_0$ to an N-th optical frequency $v_{N-1}$ in sequence and in a repetitive manner. According to the example embodiment of such an optical modulator, the light source 110 emits sequentially from a light pulse having the first optical frequency $v_0$ to a light pulse having the N-th optical frequency $v_{N-1}$. Thereafter, the light source 110 emits sequentially from the light pulse having the first optical frequency $v_0$ to the light pulse having the N-th optical frequency $v_{N-1}$ again. Accordingly, the light source 110 repeats the emitting of sequentially from the light pulse having the first optical frequency $v_0$ to the light pulse having the N-th optical frequency $v_{N-1}$. In the following description, a period in which the optical frequencies of the optical pulses change from the first optical frequency $v_0$ to the N-th optical frequency $v_{N-1}$ is referred to as an optical frequency repetition period. In an example embodiment, N is a natural number of tens or hundreds.

The distributed sensing system 100 may further include an optical circulator 120 having a first port 122 to a third port 126 and an optical fiber 130 connected to the second port 124 of the optical circulator 120. The optical circulator 120 may perform a function of passing light to be inputted only in a predetermined direction. The optical circulator 120 may be configured to receive the light emitted from the light source 110 from the first port 122 and outputs the received light to the second port 124 and to output the light inputted to the second port 124 to the third port 126. The optical fiber 130 may include a standard sensing optical fiber 140 connected to the second port 124 of the optical circulator 120 and a sensing optical fiber 150 extending from the standard sensing optical fiber 140. The sensing optical fiber 150 is installed to be inserted to a structure such as a tunnel, a submarine strategy cable, and the like, or to extend together with the structure to measure a strain in the corresponding structure. By measuring the strain in the sensing optical fiber 150, it is possible to measure the strain in the corresponding structure. For example, by measuring the strain received by the sensing optical fiber 150 at a 10 km point from the sensing optical fiber 150, the strain applied to the corresponding structure at the 10 km point may be measured. The extending length of the sensing optical fiber 150 may vary from tens to hundreds of km depending on a structure to be applied, but it should be appreciated that the length to which the sensing optical fiber 150 may extend is limited thereto. The standard sensing optical fiber 140 may compensate for an error caused by a change in light source in a strain measurement value in the sensing optical fiber 150 according to the present disclosure, and may be accommodated inside an external environmental protection case 145 so as to be isolated from external environmental factors such as external shocks and external temperature changes. In an example embodiment, the standard sensing optical fiber 140 may extend about 20 to 50 m from a front end of the sensing optical fiber 150. In an example embodiment, a temperature sensor, an environmental variable sensor, etc. are installed outside the external environmental protection case 145 to allow an operator to confirm a temperature change inside the external environmental protection case 145 and environmental parameters for the standard sensing optical fiber 140. In one example embodiment, the external environmental protection case 145 is formed of an aluminum material. In an example embodiment, a light reflection point 147 is inserted to the standard sensing optical fiber 140 so as to reflect light with a higher reflectance than Rayleigh scattered light at points of the standard sensing optical fiber 140.

When the light pulses are output to the second port 124 of the optical circulator 120, the Rayleigh scattered light is reflected back from the points of the optical fiber 130 and the reflected Rayleigh scattered light is input again to the second port 124 of the optical circulator 120 and then output to the third port 126 of the optical circulator 120. The Rayleigh scattered light output to the third port 126 of the optical circulator 120 may be output once in response to each of the optical pulses output to the second port 124 of the optical circulator 120.

The distributed sensing system 100 may further include an optical receiver 160 connected to the third port 126 of the optical circulator 120. The optical receiver 160 may be configured to provide a strain measurement value in the sensing optical fiber 150 based on the Rayleigh scattered light output to the third port 126 of the optical circulator 120. The optical receiver 160 may be further configured to provide a scattered light intensity distribution waveform representing the intensities of the scattered light reflected from different points of the optical fiber based on the Rayleigh scattered light output to the third port 126 of the optical circulator 120. The scattered light intensity distribution waveforms provided in response to the light pulses output to the second port 124 of the optical circulator 120 are associated with the optical frequencies of the light pulses output to the second port 124 of the optical circulator 120, respectively. The optical receiver 160 may be further configured to provide a strain measurement value at a particular point of the sensing optical fiber 150 by analyzing the provided scattered light intensity distribution waveforms. The optical receiver 160 may be operated according to two example embodiments to be described below to provide the strain measurement value at the particular point of the sensing optical fiber 150. However, it should be appreciated that the example embodiment in which the optical receiver 160 is operated to provide the strain measurement value in the sensing optical fiber is not limited thereto.

First Example Embodiment

The optical receiver 160 may be further configured to identify the intensity of scattered light reflected from a particular point of the sensing optical fiber 150 in the scattered light intensity distribution waveform associated with the first optical frequency $v_0$ as a first reference intensity, to identify a scattered light intensity distribution waveform in which the intensity of the scattered light reflected from the particular point is matched with the first reference intensity by examining N consecutive scattered light intensity distribution waveforms provided before the scattered light intensity distribution waveform associated with the first optical frequency $v_0$ (N consecutive scattered light intensity distribution waveforms provided in a previous optical frequency repetition period), and to determine an optical frequency associated with the identified scattered light intensity distribution waveform as a first matched optical frequency. When the intensity of the scattered light reflected from the particular point of the sensing optical fiber 150 in the scattered light intensity distribution waveform associated with the first optical frequency $v_0$ in a current optical frequency repetition period has been different from the intensity of the scattered light reflected from the particular point of the sensing optical fiber 150 in the scattered light intensity distribution waveform associated with the first optical frequency $v_0$ in the previous optical frequency repetition period, it is indicated that the strain has occurred at the particular point in the sensing optical fiber 150, and such strain to be quantified may be referred to as a first matched optical frequency. It is indicated that the strain is larger as the first matched optical frequency is further away from the first optical frequency $v_0$ and closer to the N-th optical frequency $v_{N-1}$.

The optical receiver 160 may be further configured to provide a strain measurement value at the particular point of the sensing optical fiber 150 using the first optical frequency $v_0$ and the first matched optical frequency. A strain measurement value $\Delta\varepsilon_F$ at the particular point of the sensing optical fiber 150 may include an error according to an effect by the light source, that is, a change in light source as expressed in Equation 1 below.

$$\Delta\varepsilon_F = \Delta\varepsilon_{LD} + \Delta\varepsilon_{Strain} + \Delta\varepsilon_{Temp} \quad \text{[Equation 1]}$$

In which, $\Delta\varepsilon_F$ represents the strain measurement value at the particular point of the sensing optical fiber 150, $\Delta\varepsilon_{LD}$ represents the effect by the light source, $\Delta\varepsilon_{Strain}$ represents strain according to a tensile force, and $\Delta\varepsilon_{Temp}$ represents strain according to a temperature.

The optical receiver 160 may be further configured to provide the strain measurement value $\Delta\varepsilon_F$ at the particular point of the sensing optical fiber 150 using Equation 2 below.

$$\Delta\varepsilon_F \approx -\left(\frac{1}{0.78}\right) \times \frac{\Delta v_{F_1}}{v_0} \quad \text{[Equation 2]}$$

In which, $v_0$ represents the first optical frequency, and $\Delta v_{F_1}$ represents a difference between the first optical frequency and the first matched optical frequency.

Second Example Embodiment

The optical receiver 160 may be configured to sample scattered light intensities reflected from the particular point of the sensing optical fiber 150 in the scattered light intensity distribution waveform associated with the first optical frequency $v_0$ to the scattered light intensity distribution waveform associated with the N-th optical frequency $v_{N-1}$ and to provide a scattered light intensity distribution waveform for each optical frequency associated with the particular point using the sampled scattered light intensities. Here, the scattered light intensity distribution waveform of the optical frequency associated with the particular point may be a waveform configured by summing all of the intensity of the scattered light reflected from the particular point of the sensing optical fiber 150 by outputting an optical pulse having the first optical frequency $v_0$ to the second port 124 of the optical circulator 120 to be emitted to the sensing optical fiber 150 to the intensity of the scattered light reflected from the particular point of the sensing optical fiber 150 by outputting an optical pulse having the N-th optical frequency $v_{N-1}$ to the second port 124 of the optical circulator 120 to be emitted to the sensing optical fiber 150. The optical receiver 160 may be further configured to determine a frequency shift value by comparing the scattered light intensity distribution waveform for each optical frequency associated with the particular point with the scattered light intensity distribution waveform for each optical frequency provided in a previous optical frequency repetition period in association with the particular point. Here, the frequency shift value may be referred to as a value obtained to shift the scattered light intensity distribution waveform for each optical frequency associated with the particular point along an optical frequency axis based on the scattered light intensity distribution waveform for each optical frequency provided in the previous optical frequency repetition period in association with the particular point in order to match the scattered light intensity distribution waveform for each optical frequency associated with the particular point with the scattered light intensity distribution waveform for each optical frequency provided in the previous optical frequency repetition period associated with the particular point.

The optical receiver 160 may be further configured to provide a strain measurement value at a particular point of the sensing optical fiber 150 using Equation 3 below.

$$\Delta \varepsilon_F \approx -\left(\frac{1}{0.78}\right) \times \frac{\Delta v_{F_2}}{v_0} \qquad \text{[Equation 3]}$$

In which, $\Delta \varepsilon_F$ represents the strain measurement value at the particular point of the sensing optical fiber 150, $v_0$ represents the first optical frequency, and $\Delta v_{F_2}$ represents the frequency shift value.

The distributed strain sensing system 100 may further include an optical source error compensator 170 connected to the optical receiver 160. The optical source error compensator 170 may be configured to provide a final strain measurement value by compensating for an error caused by a change in light source in the strain measurement value in the sensing optical fiber 150. The error caused by the change in light source may be an error that may vary as the power or the optical frequency of the light pulse emitted from the light source 110 may change with time. The reason is that when the power or the optical frequency of the light pulse emitted from the light source 110 changes with time, the intensity of Rayleigh scattered light reflected back and returned from the sensing optical fiber 150 also changes accordingly. The optical source error compensator 170 may be further configured to compensate for the error caused by the change in light source in the strain measurement value at the particular point of the sensing optical fiber 150 by analyzing the scattered light intensity distribution waveforms output from the optical receiver 160. The optical source error compensator 170 may be further configured to determine a strain measurement value at any one point of points of the standard sensing optical fiber 140 or an average value of strain measurement values at points of the standard sensing optical fiber 140 as the error caused by the change in light source. As described above, since the standard sensing optical fiber 140 is located inside the external environmental protection case 145 to be isolated from the external environmental factors, the Rayleigh scattered light that is not affected by the external environment is reflected. Accordingly, the strain in the standard sensing optical fiber 140 does not include a strain component according to a tensile force and a strain component according to a temperature, as shown in Equation 4 below.

$$\Delta \varepsilon_{SF} = \Delta \varepsilon_{LD} (\Delta \varepsilon_{Strain}, \Delta \varepsilon_{Temp} = 0) \qquad \text{[Equation 4]}$$

The optical source error compensator 170 may be operated according to two example embodiments to be described below in order to provide a strain measurement value at each of the points of the standard sensing optical fiber 140. However, it should be appreciated that example embodiments in which the optical source error compensator 170 is operated to provide the strain measurement value in the standard sensing optical fiber are not limited thereto.

First Example Embodiment

To determine the strain measurement value at each of the points of the standard sensing optical fiber, the optical source error compensator 170 may be further configured to identify the intensity of scattered light reflected from a corresponding point of the standard sensing optical fiber 140 in the scattered light intensity distribution waveform associated with the first optical frequency $v_0$ as a second reference intensity, to identify a scattered light intensity distribution waveform in which the intensity of the scattered light reflected from the corresponding point of the standard sensing optical fiber 140 is matched with the second reference intensity by examining N consecutive scattered light intensity distribution waveforms provided before the scattered light intensity distribution waveform associated with the first optical frequency $v_0$ (N consecutive scattered light intensity distribution waveforms provided in a previous optical frequency repetition period), and to determine an optical frequency associated with the identified scattered light intensity distribution waveform as a second matched optical frequency.

The optical source error compensator 170 may be further configured to determine a strain measurement value at each of the points of the standard sensing optical fiber 140 using the first optical frequency $v_0$ and the second matched optical frequency. The optical source error compensator 170 may be configured to determine a strain measurement value at each of the points of the standard sensing optical fiber 140 using Equation 5 below.

$$\Delta \varepsilon_{SF} \approx -\left(\frac{1}{0.78}\right) \times \frac{\Delta v_{SF_1}}{v_0} \qquad \text{[Equation 5]}$$

In which, $\Delta \varepsilon_{SF}$ represents the strain measurement value at each of the points of the standard sensing optical fiber, and $\Delta v_{SF_1}$ represents a difference between the first optical frequency $v_0$ and the second matched optical frequency.

Second Example Embodiment

To determine the strain measurement value at each of the points of the standard sensing optical fiber 140, the optical source error compensator 170 may be configured to sample scattered light intensities reflected from the corresponding point of the standard sensing optical fiber 140 in the scattered light intensity distribution waveform associated with the first optical frequency $v_0$ to the scattered light intensity distribution waveform associated with the N-th optical frequency $v_{N-1}$ and to provide a scattered light intensity distribution waveform for each optical frequency associated with the corresponding point of the standard sensing optical fiber 140 using the sampled scattered light intensities. The optical source error compensator 170 may be further configured to determine a frequency shift value by comparing the scattered light intensity distribution waveform for each optical frequency associated with the corresponding point of the standard sensing optical fiber 140 with the scattered light intensity distribution waveform for each optical frequency provided in the previous optical frequency repetition period in association with the corresponding point of the standard sensing optical fiber 140.

The optical source error compensator 170 may be further configured to use Equation 6 below in order to determine a strain measurement value at each of the points of the standard sensing optical fiber 140.

$$\Delta \varepsilon_{SF} \approx -\left(\frac{1}{0.78}\right) \times \frac{\Delta v_{SF_2}}{v_0} \qquad \text{[Equation 6]}$$

In which, $\Delta\varepsilon_{SF}$ represents the strain measurement value at the corresponding point of the standard sensing optical fiber 140, $v_0$ represents the first optical frequency, and $\Delta v_{SF_2}$ represents the frequency shift value.

When the strain measurement value at each of the points of the standard sensing optical fiber 140 is determined, the optical source error compensator 170 may be configured to calculate an average value of the strain measurement values calculated as described above to determine the average value as the error caused by the change in light source. The optical source error compensator 170 may be further configured to provide a final strain measurement value by compensating for the error caused by the change in light source in the strain measurement value in the sensing optical fiber 150 according to Equation 7 below.

$$\Delta\varepsilon=\Delta\varepsilon_F-\Delta\varepsilon_{SF}=\Delta\varepsilon_{Strain}+\Delta\varepsilon_{Temp} \quad \text{[Equation 7]}$$

In which, $\Delta\varepsilon$ represents the final strain measurement value.

Figure 2:
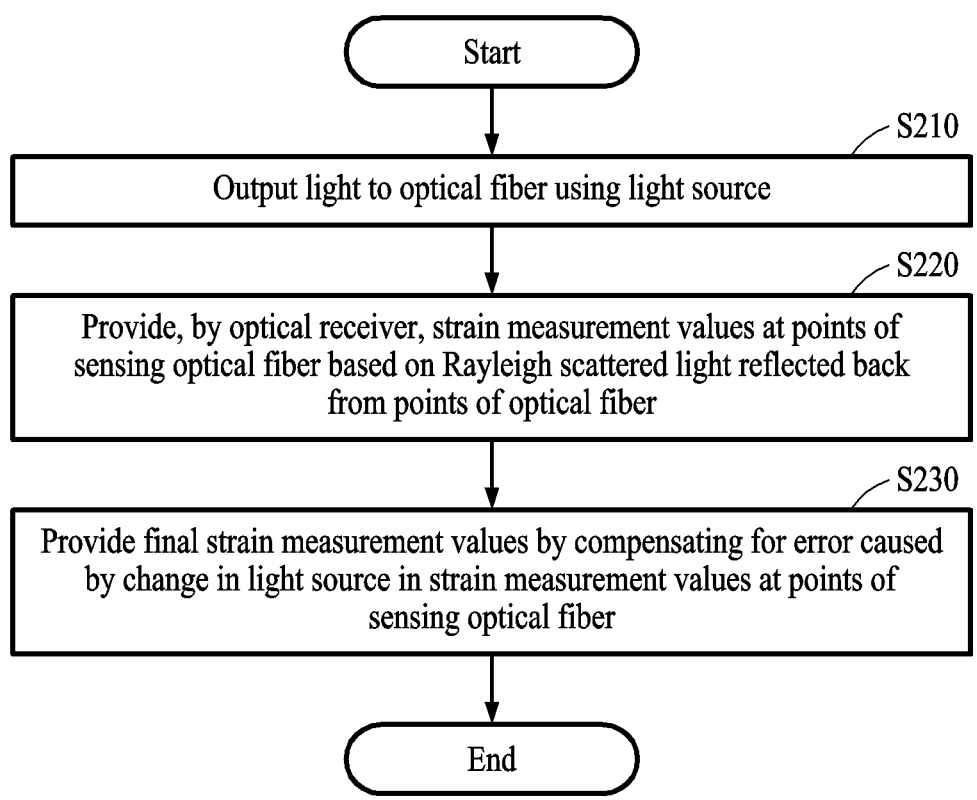
FIG. 2 is a diagram illustrating a flowchart for describing an example embodiment of a method for providing a strain measurement value in a sensing optical fiber using the distributed strain sensing system of FIG. 1.

FIG. 2 is a diagram illustrating a flowchart for describing an example embodiment of a method for providing a strain measurement value in a sensing optical fiber using the distributed strain sensing system of FIG. 1.

An example embodiment of the method starts from outputting light to the optical fiber 130 using the light source 110 (S210). As described above, the optical fiber 130 includes the standard sensing optical fiber 140 and the sensing optical fiber 150 extending from the standard sensing optical fiber 140, and the standard sensing optical fiber 140 may be accommodated inside the external environmental protection case 145. The light output to the optical fiber 130 may be a train of light pulses having a specific period. The output optical pulses may have N optical frequencies from a first optical frequency $v_0$ to an N-th optical frequency $v_{N-1}$ sequentially and repetitively. In step S220, the optical receiver 160 provides strain measurement values at the points of the sensing optical fiber 150 based on Rayleigh scattered light reflected back from the points of the optical fiber 130. The optical receiver 160 receives the Rayleigh scattered light once in response to each of the optical pulses emitted to the optical fiber 130, but provides a scattered light intensity distribution waveform indicating the intensities of the scattered light reflected from different points of the optical fiber 130 based on the Rayleigh scattered light received once. The optical receiver 160 provides strain measurement values at the points of the sensing optical fiber 150 by analyzing the provided scattered light intensity distribution waveforms. In step S230, final strain measurement values are provided by compensating for an error caused by the change in light source in the strain measurement values at the points of the sensing optical fiber 150.

Figure 3:
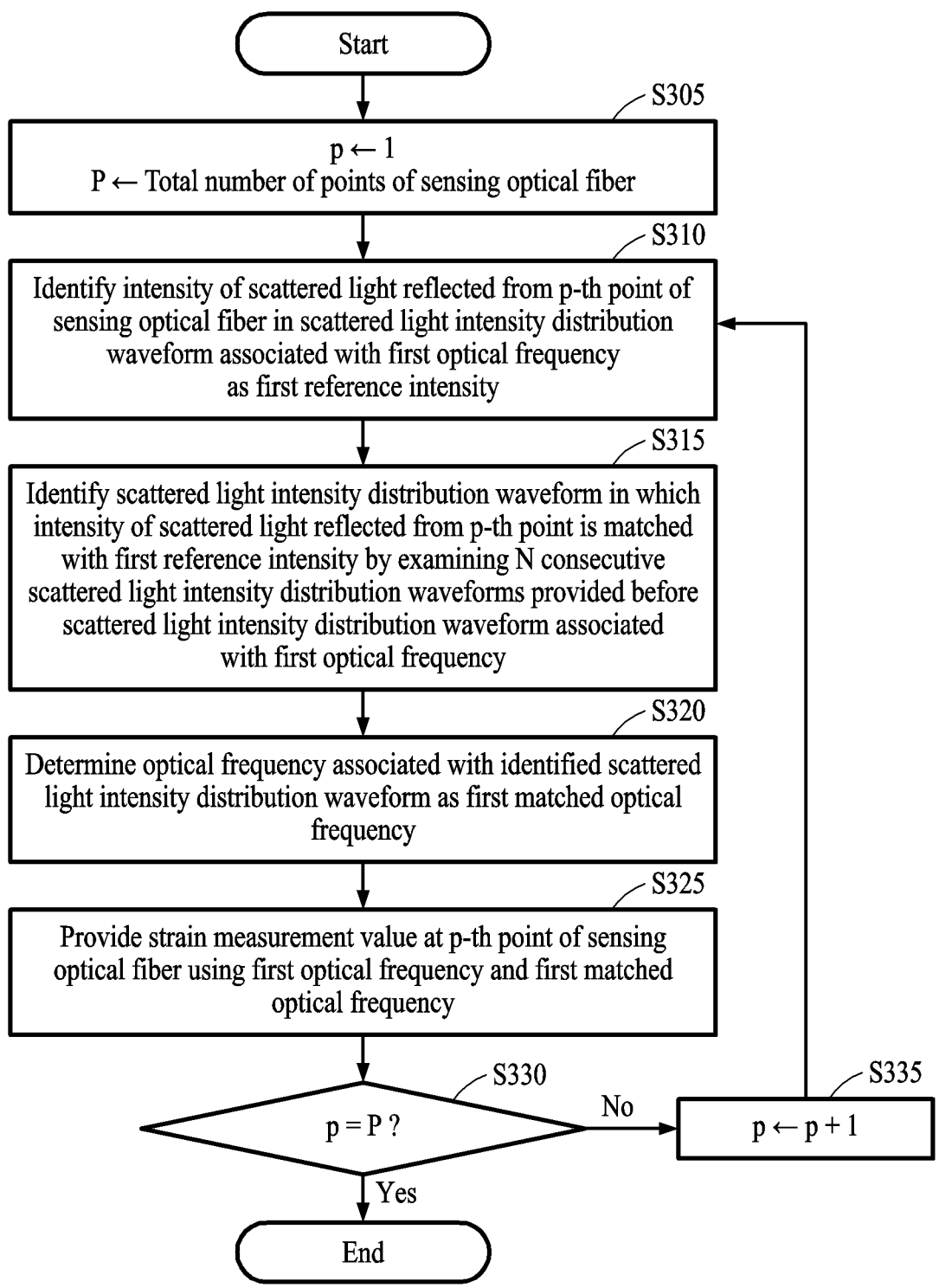
FIG. 3 is a diagram illustrating a flowchart for describing a first example embodiment of a method for providing strain measurement values at points of the sensing optical fiber.

FIG. 3 is a diagram illustrating a flowchart for describing a first example embodiment of a method for providing strain measurement values at points of the sensing optical fiber.

A first example embodiment of the method starts from setting a parameter p to 1 and setting a parameter P to the total number of points of the sensing optical fiber 150 (S305). In step S310, the intensity of the scattered light reflected from a p-th point of the sensing optical fiber 150 in the scattered light intensity distribution waveform associated with the first optical frequency $v_0$ is identified as a first reference intensity. In step S315, a scattered light intensity distribution waveform in which the intensity of the scattered light reflected from the p-th point is matched with the first reference intensity is identified by examining N consecutive scattered light intensity distribution waveforms provided before the scattered light intensity distribution waveform associated with the first optical frequency $v_0$. In step S320, the optical frequency associated with the identified scattered light intensity distribution waveform is determined as a first matched optical frequency. In step S325, a strain measurement value at the p-th point of the sensing optical fiber 150 is provided using the first optical frequency $v_0$ and the first matched optical frequency. In step S325, the strain measurement value at the p-th point of the sensing optical fiber 150 may be provided using Equation 2. In step S325, $\Delta\varepsilon_F$ represents the strain measurement value at the p-th point of the sensing optical fiber 150 by using Equation 2. In step S330, it is examined whether the parameter p is equal to P. When it is determined that the parameter p is equal to P as a result of the examination in step S330, the process is terminated. On the other hand, if the parameter p is not equal to P as the result of the examination in step S330, the process is performed to step S335 to increase the parameter p by 1, and then returns to step S310.

Figure 4:
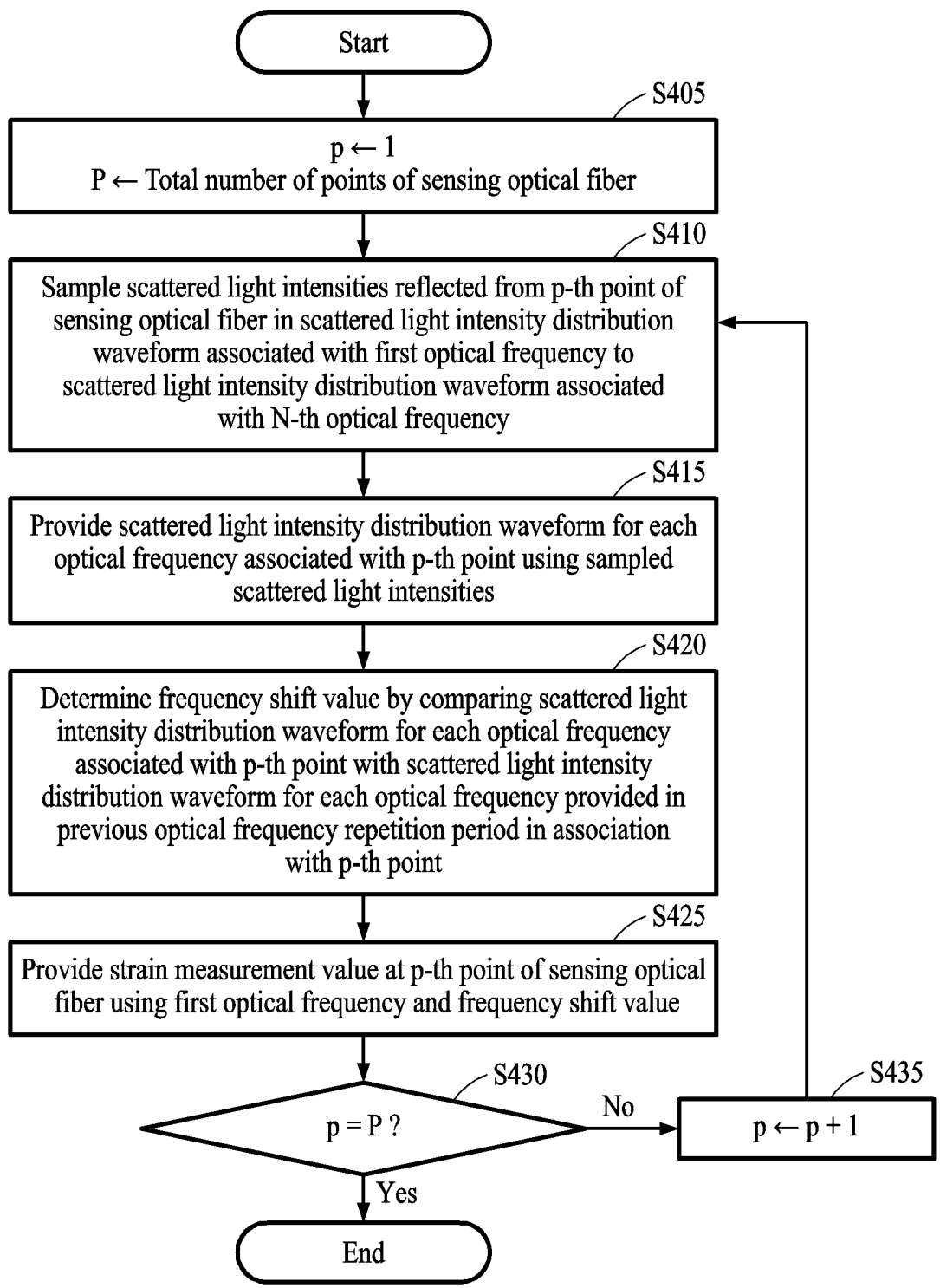
FIG. 4 is a diagram illustrating a flowchart for describing a second example embodiment of a method for providing strain measurement values at points of the sensing optical fiber.

FIG. 4 is a diagram illustrating a flowchart for describing a second example embodiment of a method for providing strain measurement values at points of the sensing optical fiber.

A second example embodiment of the method starts from setting a parameter p to 1 and setting a parameter P to the total number of points of the sensing optical fiber 150 (S405). In step S410, scattered light intensities reflected from the p-th point of the sensing optical fiber 150 are sampled in the scattered light intensity distribution waveform associated with the first optical frequency $v_0$ to the scattered light intensity distribution waveform associated with the N-th optical frequency $v_{N-1}$. In step S415, a scattered light intensity distribution waveform for each optical frequency associated with the p-th point is provided using the sampled scattered light intensities. In step S420, a frequency shift value is determined by comparing the scattered light intensity distribution waveform for each optical frequency associated with the p-th point with the scattered light intensity distribution waveform for each optical frequency provided in the previous optical frequency repetition period in association with the p-th point. In step S425, a strain measurement value at the p-th point of the sensing optical fiber 150 is provided using the first optical frequency $v_0$ and the frequency shift value. In step S425, the strain measurement value at the p-th point of the sensing optical fiber 150 may be provided using Equation 3. In step S425, $\Delta\varepsilon_F$ represents the strain measurement value at the p-th point of the sensing optical fiber 150 by using Equation 3. In step S430, it is examined whether the parameter p is equal to P. When it is determined that the parameter p is equal to P as a result of the examination in step S430, the process is terminated. On the other hand, if the parameter p is not equal to P as the result of the examination in step S430, the process is performed to step S435 to increase the parameter p by 1, and then returns to step S410.

Figure 5:
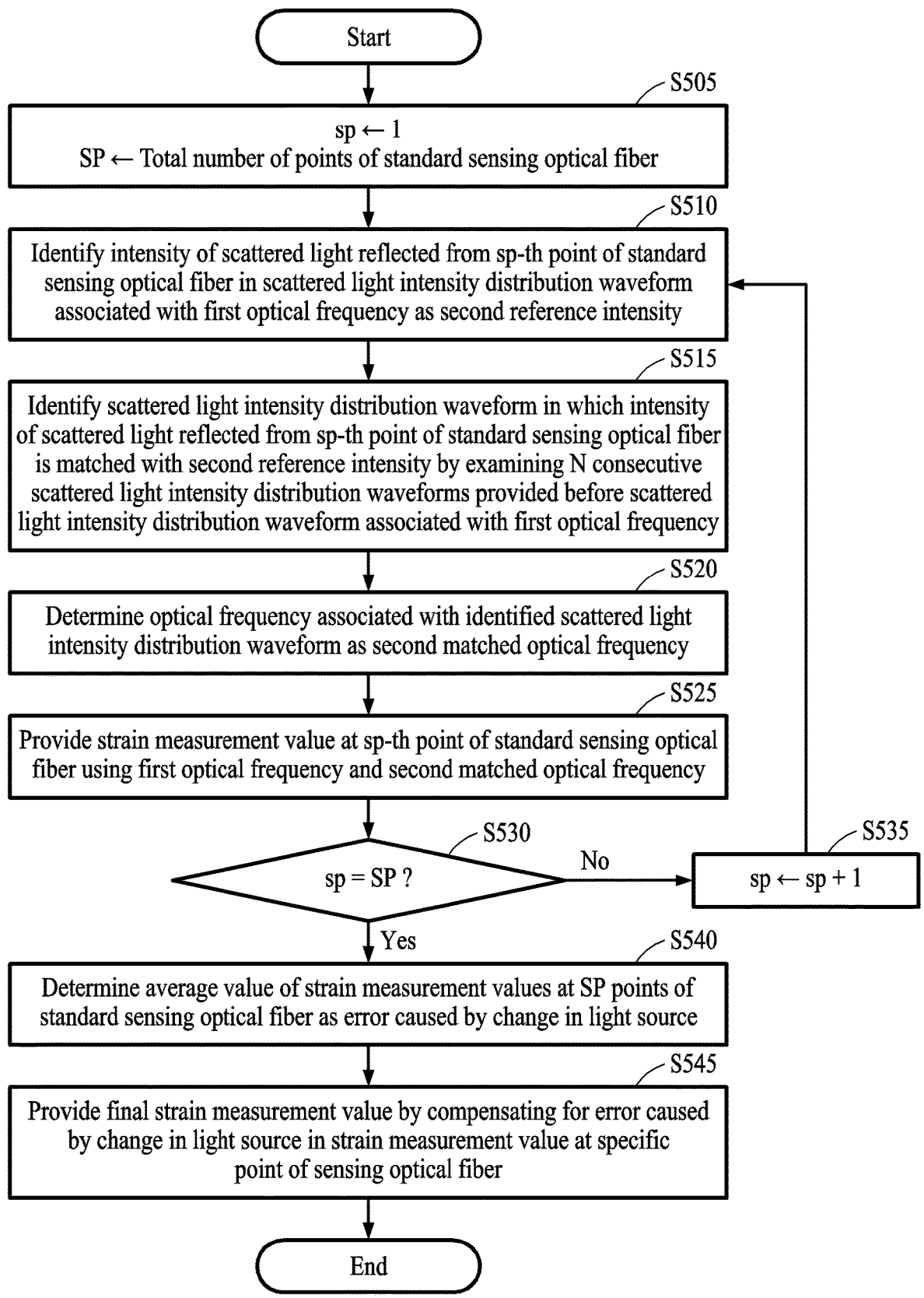
FIG. 5 is a diagram illustrating a flowchart for describing a first example embodiment of a method of providing a final strain measurement value by compensating for an error caused by a change in light source in a strain measurement value at a particular point of the sensing optical fiber.

FIG. 5 is a diagram illustrating a flowchart for describing a first example embodiment of a method of providing a final strain measurement value by compensating for an error caused by a change in light source in a strain measurement value at a particular point of the sensing optical fiber.

A first example embodiment of the method starts from setting a parameter sp to 1 and setting a parameter SP to the total number of points of the standard sensing optical fiber 140 (S505). In step S510, the intensity of the scattered light reflected from a sp-th point of the standard sensing optical fiber 140 in the scattered light intensity distribution waveform associated with the first optical frequency $v_0$ is identified as a second reference intensity. In step S515, a scattered light intensity distribution waveform in which the intensity of the scattered light reflected from the sp-th point of the standard sensing optical fiber 140 is matched with the second reference intensity is identified by examining N consecutive scattered light intensity distribution waveforms provided before the scattered light intensity distribution waveform associated with the first optical frequency $v_0$. In step S520, the optical frequency associated with the identified scattered light intensity distribution waveform is determined as a second matched optical frequency. In step S525, a strain measurement value at the sp-th point of the standard sensing optical fiber 140 is provided using the first optical frequency $v_0$ and the second matched optical frequency. In step S525, the strain measurement value at the sp-th point of the standard sensing optical fiber 140 may be provided using Equation 4. In step S525, $\Delta\varepsilon_{SF}$ represents the strain measurement value at the sp-th point of the standard sensing optical fiber 140 by using Equation 4. In step S530, it is examined whether the parameter sp is equal to SP. When the parameter sp is not equal to SP as the result of the examination in step S530, the process is performed to step S535 to increase the parameter sp by 1, and then returns to step S510. On the other hand, when it is determined that the parameter sp is equal to SP as the result of the examination in step S530, the process is performed to step S540 to determine an average value of strain measurement values at SP points of the standard sensing optical fiber 140 as an error caused by a change in light source. In step S545, a final strain measurement value $\Delta\varepsilon$ is provided by compensating for the error caused by the change in light source in the strain measurement value at the particular point of the sensing optical fiber 150 using Equation 7.

Figure 6:
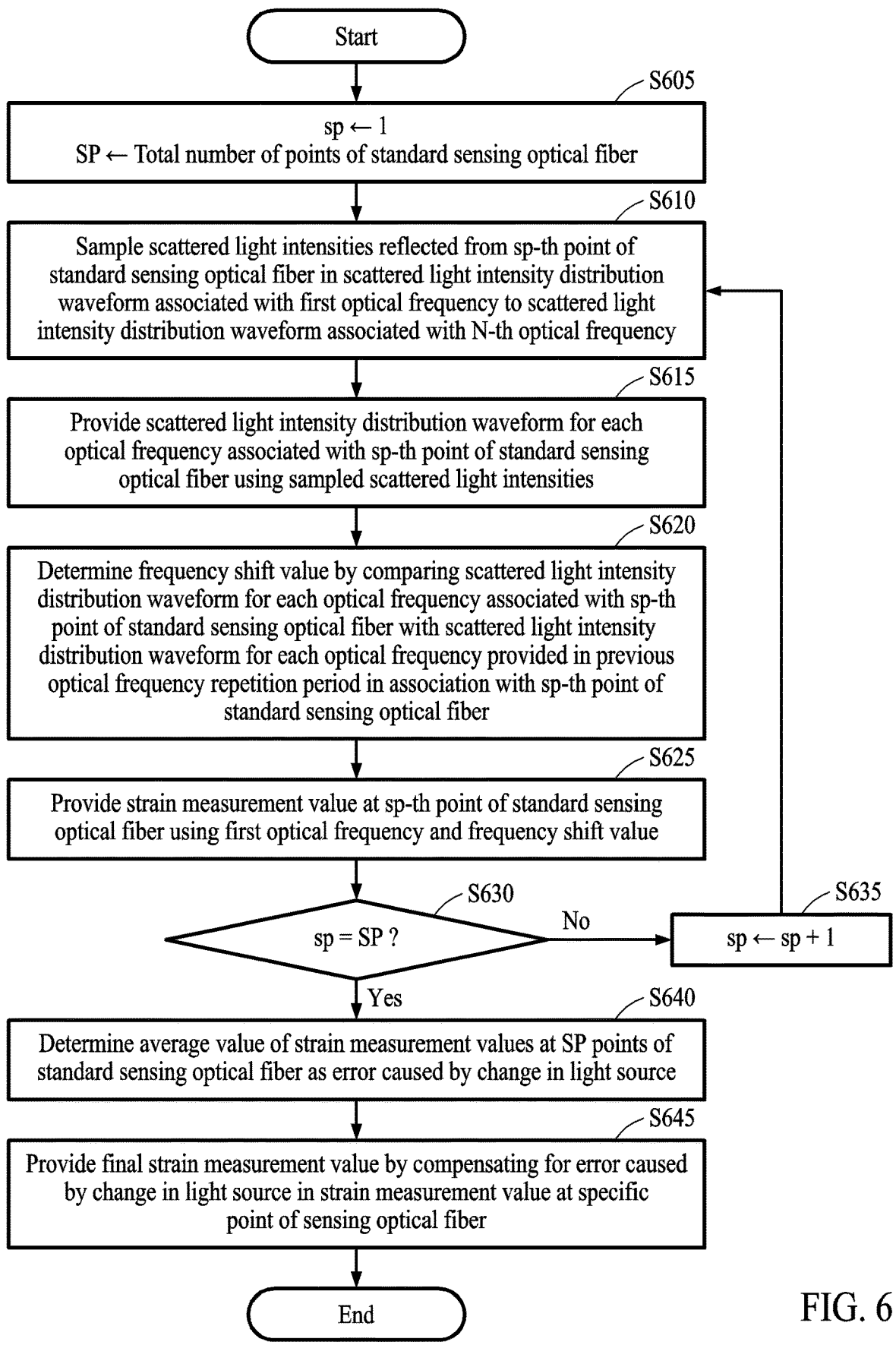
FIG. 6 is a diagram illustrating a flowchart for describing a second example embodiment of a method of providing a final strain measurement value by compensating for an error caused by a change in light source in a strain measurement value at a particular point of the sensing optical fiber.

FIG. 6 is a diagram illustrating a flowchart for describing a second example embodiment of a method of providing a final strain measurement value by compensating for an error caused by a change in light source in a strain measurement value at a particular point of the sensing optical fiber.

A second example embodiment of the method starts from setting a parameter sp to 1 and setting a parameter SP to the total number of points of the standard sensing optical fiber 140 (S605). In step S610, scattered light intensities reflected from the sp-th point of the standard sensing optical fiber 140 are sampled in the scattered light intensity distribution waveform associated with the first optical frequency $v_0$ to the scattered light intensity distribution waveform associated with the N-th optical frequency $v_{N-1}$. In step S615, a scattered light intensity distribution waveform for each optical frequency associated with the sp-th point of the standard sensing optical fiber 140 is provided using the sampled scattered light intensities. In step S620, a frequency shift value is determined by comparing the scattered light intensity distribution waveform for each optical frequency associated with the sp-th point of the standard sensing optical fiber 140 with the scattered light intensity distribution waveform for each optical frequency provided in the previous optical frequency repetition period in association with the sp-th point of the standard sensing optical fiber 140. In step S625, a strain measurement value at the sp-th point of the standard sensing optical fiber 140 is provided using the first optical frequency $v_0$ and the frequency shift value. In step S625, the strain measurement value at the sp-th point of the standard sensing optical fiber 140 may be provided using Equation 6. In step S625, $\Delta\varepsilon_{SF}$ represents the strain measurement value at the sp-th point of the standard sensing optical fiber 140 by using Equation 6. In step S630, it is examined whether the parameter sp is equal to SP. When the parameter sp is not equal to SP as the result of the examination in step S630, the process is performed to step S635 to increase the parameter sp by 1, and then returns to step S610. On the other hand, when it is determined that the parameter sp is equal to SP as the result of the examination in step S630, the process is performed to step S640 to determine an average value of strain measurement values at SP points of the standard sensing optical fiber 140 as an error caused by a change in light source. In step S645, a final strain measurement value $\Delta\varepsilon$ is provided by compensating for the error caused by the change in light source in the strain measurement value at the particular point of the sensing optical fiber 150 using Equation 7.

According to the example embodiments described above, it is possible to precisely compensate for errors caused by the change in light source in the distributed strain detection system and further to continuously compensate for the errors caused by the change in light source in real time in an actual operation of the distributed strain detection system. Further, according to the example embodiments described above, since there is no need to add a separate compensation measuring device in implementing the distributed strain detection system, it is advantageous in terms of economy.

The example embodiments described above may be implemented in hardware components, software components, and/or combinations of hardware components and software components. For example, the apparatus, the method, and the components described in the example embodiments may be implemented using, for example, one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or other any devices capable of executing and responding instructions. The processing device may perform an operating system OS and software applications performed on the operating system. In addition, the processing device may also access, store, manipulate, process, and generate data in response to execution of software. For convenience of understanding, one processing device may be described to be used, but it may be seen to those skilled in the art that the processing device may include a plurality of processing elements and/or a plurality types of processing elements. For example, the processing device may include a plurality of processors or one processor and one controller. In addition, other processing configurations, such as a parallel processor are also possible.

Software may include computer programs, codes, instructions, or one or more combinations thereof, and may configure the processing device to operate as desired, or to instruct independently or collectively the processing device. Software and/or data are interpreted by the processing device or may be permanently or temporarily embodied in any type of machines, components, physical devices, virtual equipment, computer storage media or devices, or signal waves to be transmitted, in order to provide commends or data to the processing device. The software may be distributed on a computer system connected via a network, and may be stored or executed in a distributed method. The software and the data may be stored in computer readable recording media.

The method according to the example embodiment may be implemented in a form of program instructions which may be performed through various computer means to be recorded in computer readable media. The computer readable media may include program instructions, data files, data structures, etc. alone or in combination, and the program instructions recorded on the media may be specially designed and configured for the example embodiments, or may be known and usable to those skilled in the art of computer software. Examples of the computer readable media include magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program instructions. Examples of the program instructions include high language codes executable by a computer using an interpreter and the like, as well as machine language codes created by a compiler.

The hardware devices described above may be configured to operate as one or a plurality of software modules in order to perform the operations of the example embodiments, and vice versa.

As described above, although the example embodiments have been described by the restricted drawings, various modifications and variations can be applied based on the example embodiments by those skilled in the art. For example, even if the described techniques are performed in a different order from the described method, and/or components such as a system, a structure, a device, a circuit, and the like described above are coupled or combined in a different form from the described method, or replaced or substituted by other components or equivalents, an appropriate result can be achieved.

Therefore, other implementations, other example embodiments, and equivalents to the appended claims fall within the scope of the claims to be described below.

What is claimed is:

1. A distributed strain sensing system comprising:
   a light source configured to emit light, the light source including an optical modulator configured to modulate the light emitted from the light source;
   an optical circulator having a first port, a second port, and a third port, the optical circulator being configured to receive the light emitted from the light source via the first port and output the received light via the second port;
   an optical fiber connected to the second port of the optical circulator, wherein the optical fiber includes a standard sensing optical fiber connected to the second port of the optical circulator and a sensing optical fiber extending from the standard sensing optical fiber, and wherein the standard sensing optical fiber is housed inside an external environmental protection case;
   an optical receiver connected to the third port of the optical circulator; and
   an optical source error compensator connected to the optical receiver,
   wherein the optical circulator is configured to receive Rayleigh scattered light reflected back from different points of the optical fiber via the second port and output the received light via the third port,
   wherein the optical receiver is configured to provide a measurement value of strain in the sensing optical fiber based on the Rayleigh scattered light outputted via the third port of the optical circulator
   wherein the optical source error compensator is configured to provide a final measurement value of strain by compensating the measurement value of strain for an error caused by a deviation in the light emitted from the light source,
   wherein the optical modulator includes a software routine that modulates the light emitted from the light source so that a train of light pulses having a predetermined period is emitted from the light source, and
   wherein the optical modulator further includes a software routine that modulates the light emitted from the light source so that the light pulses have N different optical frequencies ranging from a first optical frequency to an N-th optical frequency in sequence and in a repetitive manner, wherein N is a natural number.

2. The distributed strain sensing system of claim 1, wherein the Rayleigh scattered light is outputted via the third port of the optical circulator once in response to each of the light pulses being outputted via the second port of the optical circulator,
   wherein the optical receiver is further configured to provide a scattered light intensity distribution waveform representing intensities of the scattered lights reflected from the different points of the optical fiber based on the Rayleigh scattered light outputted via the third port of the optical circulator, and
   wherein the scattered light intensity distribution waveforms provided in response to the light pulses being outputted via the second port of the optical circulator are associated with the optical frequencies of the light pulses outputted via the second port of the optical circulator, respectively.

3. The distributed strain sensing system of claim 2, wherein the optical receiver is further configured to provide a measurement value of strain at a particular point of the sensing optical fiber by analyzing the provided scattered light intensity distribution waveforms.

4. The distributed strain sensing system of claim 3, wherein the optical receiver is further configured to:
   identify, as a first reference intensity, an intensity of the scattered light reflected from the particular point of the sensing optical fiber in the scattered light intensity distribution waveform associated with the first optical frequency,
   identify a specific scattered light intensity distribution waveform having an intensity of the scattered light reflected from the particular point, which is matched with the first reference intensity, by examining N consecutive scattered light intensity distribution waveforms provided before the scattered light intensity distribution waveform associated with the first optical frequency, and
   determine an optical frequency associated with the specific scattered light intensity distribution waveform as a first matched optical frequency.

5. The distributed strain sensing system of claim 4, wherein the optical receiver is further configured to provide a measurement value of strain at the particular point of the sensing optical fiber using the first optical frequency and the first matched optical frequency.

6. The distributed strain sensing system of claim 5, wherein the optical receiver is further configured to provide a measurement value of strain at the particular point of the sensing optical fiber using the following equation:

$$\Delta \varepsilon_F \approx -\left(\frac{1}{0.78}\right) \times \frac{\Delta v_{F_1}}{v_0}$$

wherein $\Delta \varepsilon_F$ represents a measurement value of strain at the particular point of the sensing optical fiber, $v_0$ represents the first optical frequency, and $\Delta v_{F_1}$ represents a difference between the first optical frequency and the first matched optical frequency.

7. The distributed strain sensing system of claim 3, wherein the optical receiver is further configured to:
   sample the N scattered light intensity distribution waveforms associated respectively with the N different optical frequencies to collect scattered light intensities reflected from the particular point of the sensing optical fiber,
   provide a first scattered light intensity distribution waveform relating to the particular point using the collected scattered light intensities, the first scattered light intensity distribution waveform relating to the particular point representing the collected scattered light intensities with respect to the N different optical frequencies, and
   determine a frequency shift value by comparing the first scattered light intensity distribution waveform relating to the particular point with a second scattered light intensity distribution waveform provided previously in relation to the particular point.

8. The distributed strain sensing system of claim 7, wherein the optical receiver is further configured to provide a measurement value of strain at the particular point of the sensing optical fiber using the following equation:

$$\Delta\varepsilon_F \approx -\left(\frac{1}{0.78}\right) \times \frac{\Delta v_{F_2}}{v_0}$$

wherein $\Delta\varepsilon_F$ represents a measurement value of strain at the particular point of the sensing optical fiber, $v_0$ represents the first optical frequency, and $\Delta v_{F_2}$ represents the frequency shift value.

9. The distributed strain sensing system of claim 2, wherein the optical receiver outputs the provided scattered light intensity distribution waveforms, and the optical source error compensator is further configured to compensate the measurement value of strain at the particular point of the sensing optical fiber for the error caused by the deviation in the light emitted from the light source by analyzing the outputted scattered light intensity distribution waveforms.

10. The distributed strain sensing system of claim 9, wherein the optical source error compensator is further configured to determine a measurement value of strain at any one of the different points of the standard sensing optical fiber or an average value of measurement values of strain at the different points of the standard sensing optical fiber as the error caused by the deviation in the light emitted from the light source.

11. The distributed strain sensing system of claim 10, wherein for the determination of the measurement value of strain at each of the different points of the standard sensing optical fiber, the optical source error compensator is further configured to:
    identify, as a second reference intensity, an intensity of the scattered light reflected from the respective point of the standard sensing optical fiber in the scattered light intensity distribution waveform associated with the first optical frequency,
    identify a specific scattered light intensity distribution waveform having an intensity of the scattered light reflected from the respective point of the standard sensing optical fiber, which is matched with the second reference intensity, by examining N consecutive scattered light intensity distribution waveforms provided before the scattered light intensity distribution waveform associated with the first optical frequency, and
    determine an optical frequency associated with the specific scattered light intensity distribution waveform as a second matched optical frequency.

12. The distributed strain sensing system of claim 11, wherein the optical source error compensator uses the first optical frequency and the second matched optical frequency to determine a measurement value of strain at each of the different points of the standard sensing optical fiber.

13. The distributed strain sensing system of claim 12, wherein the optical source error compensator is further configured to use the following equation to determine a measurement value of strain at each of the different points of the standard sensing optical fiber:

$$\Delta\varepsilon_{SF} \approx -\left(\frac{1}{0.78}\right) \times \frac{\Delta v_{SF_1}}{v_0}$$

wherein $\Delta\varepsilon_{SF}$ represents a measurement value of strain at the respective point of the standard sensing optical fiber, $v_0$ represents the first optical frequency, and $\Delta v_{SF_1}$ represents a difference between the first optical frequency and the second matched optical frequency.

14. The distributed strain sensing system of claim 10, wherein for the determination of the measurement value of strain at each of the different points of the standard sensing optical fiber, the optical source error compensator is further configured to:
    sample the N scattered light intensity distribution waveforms associated respectively with the N different optical frequencies to collect scattered light intensities reflected from the respective point of the standard sensing optical fiber,
    provide a first scattered light intensity distribution waveform relating to the respective point of the standard sensing optical fiber using the collected scattered light intensities, the first scattered light intensity distribution waveform relating to the respective point representing the collected scattered light intensities with respect to the N different optical frequencies, and
    determine a frequency shift value by comparing the first scattered light intensity distribution waveform relating to the respective point of the standard sensing optical fiber with a second scattered light intensity distribution waveform provided previously in relation to the respective point of the standard sensing optical fiber.

15. The distributed strain sensing system of claim 14, wherein the optical source error compensator is further configured to use the following equation to determine a measurement value of strain at each of the different points of the standard sensing optical fiber:

$$\Delta\varepsilon_{SF} \approx -\left(\frac{1}{0.78}\right) \times \frac{\Delta v_{SF_2}}{v_0}$$

wherein $\Delta\varepsilon_{SF}$ represents a measurement value of strain at the respective point of the standard sensing optical fiber, $v_0$ represents the first optical frequency, and $\Delta v_{SF_2}$ represents the frequency shift value.

16. The distributed strain sensing system of claim 1, wherein a light reflection point is inserted into the standard sensing optical fiber so as to have light with a higher reflectance than Rayleigh scattered light reflected at the different points of the standard sensing optical fiber.

17. A distributed strain sensing system comprising:
a light source configured to emit light, the light source including an optical modulator configured to modulate the light emitted from the light source;
an optical circulator having a first port, a second port, and a third port, the optical circulator being configured to receive the light emitted from the light source via the first port and output the received light via the second port;
an optical fiber connected to the second port of the optical circulator, wherein the optical fiber includes a standard sensing optical fiber connected to the second port of the optical circulator and a sensing optical fiber extending from the standard sensing optical fiber, and wherein the standard sensing optical fiber is housed inside an external environmental protection case, wherein a light reflection point is inserted into the standard sensing optical fiber within the external environmental protection case so as to have light with a higher reflectance than Rayleigh scattered light reflected at the different points of the standard sensing optical fiber;
an optical receiver connected to the third port of the optical circulator; and
an optical source error compensator connected to the optical receiver,
wherein the optical circulator is configured to receive Rayleigh scattered light reflected back from different points of the optical fiber via the second port and output the received light via the third port,
wherein the optical receiver is configured to provide a measurement value of strain in the sensing optical fiber based on the Rayleigh scattered light outputted via the third port of the optical circulator;
wherein the optical source error compensator is configured to provide a final measurement value of strain by compensating the measurement value of strain for an error caused by a deviation in the light emitted from the light source,
wherein the optical modulator includes a software routine that modulates the light emitted from the light source so that a train of light pulses having a predetermined period is emitted from the light source, and
wherein the optical modulator further includes a software routine that modulates the light emitted from the light source so that the light pulses have N different optical frequencies ranging from a first optical frequency to an N-th optical frequency in sequence and in a repetitive manner, wherein N is a natural number;
wherein the Rayleigh scattered light is outputted via the third port of the optical circulator once in response to each of the light pulses being outputted via the second port of the optical circulator,
wherein the optical receiver is further configured to provide a scattered light intensity distribution waveform representing intensities of the scattered lights reflected from the different points of the optical fiber based on the Rayleigh scattered light outputted via the third port of the optical circulator, and
wherein the scattered light intensity distribution waveforms provided in response to the light pulses being outputted via the second port of the optical circulator are associated with the optical frequencies of the light pulses outputted via the second port of the optical circulator, respectively;

wherein the optical receiver is further configured to provide a measurement value of strain at a particular point of the sensing optical fiber by analyzing the provided scattered light intensity distribution waveforms;
wherein the optical receiver is further configured to:
identify, as a first reference intensity, an intensity of the scattered light reflected from the particular point of the sensing optical fiber in the scattered light intensity distribution waveform associated with the first optical frequency,
identify a specific scattered light intensity distribution waveform having an intensity of the scattered light reflected from the particular point, which is matched with the first reference intensity, by examining N consecutive scattered light intensity distribution waveforms provided before the scattered light intensity distribution waveform associated with the first optical frequency, and
determine an optical frequency associated with the specific scattered light intensity distribution waveform as a first matched optical frequency;
wherein the optical receiver is further configured to provide a measurement value of strain at the particular point of the sensing optical fiber using the first optical frequency and the first matched optical frequency;
wherein the optical receiver is further configured to provide a measurement value of strain at the particular point of the sensing optical fiber using the following equation:

$$\Delta \varepsilon_F \approx -\left(\frac{1}{0.78}\right) \times \frac{\Delta v_{F_1}}{v_0}$$

wherein $\Delta \varepsilon_F$ represents a measurement value of strain at the particular point of the sensing optical fiber, $v_0$ represents the first optical frequency, and $\Delta v_{F_1}$ represents a difference between the first optical frequency and the first matched optical frequency;
wherein the optical source error compensator is further configured to determine a measurement value of strain at any one of the different points of the standard sensing optical fiber as the error caused by the deviation in the light emitted from the light source;
wherein for the determination of the measurement value of strain at each of the different points of the standard sensing optical fiber, the optical source error compensator is further configured to:
identify, as a second reference intensity, an intensity of the scattered light reflected from the respective point of the standard sensing optical fiber in the scattered light intensity distribution waveform associated with the first optical frequency,
identify a specific scattered light intensity distribution waveform having an intensity of the scattered light reflected from the respective point of the standard sensing optical fiber, which is matched with the second reference intensity, by examining N consecutive scattered light intensity distribution waveforms provided before the scattered light intensity distribution waveform associated with the first optical frequency, and
determine an optical frequency associated with the specific scattered light intensity distribution waveform as a second matched optical frequency;

wherein the optical source error compensator uses the first optical frequency and the second matched optical frequency to determine a measurement value of strain at each of the different points of the standard sensing optical fiber; and wherein the optical source error compensator is further configured to use the following equation to determine a measurement value of strain at each of the different points of the standard sensing optical fiber:

$$\Delta \varepsilon_{SF} \approx -\left(\frac{1}{0.78}\right) \times \frac{\Delta v_{SF_1}}{v_0}$$

wherein $\Delta \varepsilon_{SF}$ represents a measurement value of strain at the respective point of the standard sensing optical fiber, $v_0$ represents the first optical frequency, and $\Delta v_{SF_1}$ represents a difference between the first optical frequency and the second matched optical frequency.

* * * * *